United States Patent [19]
Niertit et al.

[11] Patent Number: 5,414,460
[45] Date of Patent: May 9, 1995

[54] MECHANICAL APERTURE FOR CONTROLLING ILLUMINATION LEVEL

[75] Inventors: Thomas Niertit, Webster; James D. Mckay, Penfield; Raymond L. Dewolf; Richard J. Sandor, both of Rochester, all of N.Y.

[21] Appl. No.: 73,820

[22] Filed: Jun. 8, 1993

[51] Int. Cl.$^6$ .................. H04N 5/253; H04N 5/238
[52] U.S. Cl. .................... 348/97; 348/363; 354/270
[58] Field of Search .................. 348/97, 362, 363; 354/446, 454, 270

[56] References Cited

U.S. PATENT DOCUMENTS

| | | | |
|---|---|---|---|
| 3,962,707 | 6/1976 | Galbraith, Jr. | 354/451 |
| 3,980,407 | 9/1976 | Hill | 355/71 |
| 4,118,714 | 10/1978 | Okajima et al. | 354/451 X |
| 4,531,820 | 7/1985 | Petersen | 354/234.1 |
| 4,558,368 | 12/1985 | Aoki et al. | 358/228 |
| 4,592,632 | 6/1986 | Renold | 352/214 |
| 4,710,013 | 12/1987 | Wong | 354/446 X |
| 4,727,427 | 2/1988 | Kime | 358/228 |
| 4,868,383 | 9/1989 | Kurtz et al. | 250/228 |
| 4,875,103 | 10/1989 | Bridges et al. | 358/214 |
| 4,884,091 | 11/1989 | Nakagomi | 354/270 |
| 4,899,040 | 2/1990 | Davis et al. | 250/216 |
| 4,959,728 | 9/1990 | Takahashi et al. | 348/363 |
| 5,003,379 | 3/1991 | Moore, Jr. et al. | 358/54 |
| 5,012,346 | 4/1991 | DeJager et al. | 358/214 |
| 5,023,723 | 6/1991 | Date et al. | 358/225 |
| 5,038,216 | 8/1991 | Easterly et al. | 358/228 |
| 5,072,162 | 12/1991 | Sato et al. | 318/268 |
| 5,084,754 | 1/1992 | Tomitaka | 358/209 |
| 5,084,755 | 1/1992 | Ozaki | 358/214 |
| 5,122,880 | 6/1992 | Nagano | 358/209 |
| 5,150,702 | 9/1992 | Miyanaga et al. | 128/6 |
| 5,155,596 | 10/1992 | Kurtz et al. | 348/97 |
| 5,161,026 | 11/1992 | Mabuchi et al. | 358/225 |

FOREIGN PATENT DOCUMENTS

| | | | |
|---|---|---|---|
| 0492617 | 7/1992 | European Pat. Off. | G03B 7/085 |
| 55-105479 | 8/1980 | Japan | H04N 5/26 |

OTHER PUBLICATIONS

Kurtz et al., "Optical scanning system for a CCD telecine for HDTV" SRIE vol. 1448, pp. 191–205 (1991).

Primary Examiner—Michael T. Razavi
Assistant Examiner—Wendy R. Greening
Attorney, Agent or Firm—Joseph F. Breimayer

[57] ABSTRACT

In an illumination system for a film telecine scanner of the type adapted to provide a line of illumination on the image frames of a film which is supported for rapid movement in a film gate of the scanner, an improved light control system for adjusting the amount of light that is delivered from a light source to an integrating cylinder to take into account fluctuations in intensity of the light source and desired intensity changes in the line of illumination upon a change of scene in the image frames of the film as the film is being scanned. The light control system includes aperture defining apparatus for selectively adjusting the amount of light entering said integrating cylinder in response to the commanded light intensity signal within the time span of scanning a single image frame of the film. The aperture setting apparatus comprises a housing containing a continuous, single piece, elongated band having first and second centrally disposed light obstructing or solid band sections formed in parallel planes with respect to one another and first and second light transmitting or cut-out band sections separating the first and second light obstructing band sections and forming end loops of the elongated band, the first and second shaped leading edges formed as edges of the first and second light obstructing band sections defining one side of the first and second respective light transmitting band sections which face one another and interrupt the light beam in near the same plane as the first and second light obstructing band sections are moved in parallel with respect to one another and the opening. In order to support and move the elongated band, a tension and return idler assembly supported by the housing engages and provide rotational and tensioning support for the end loop of the first light transmitting section. A motor drive assembly supported by the housing engages and provide rotational driving force to the end loop of the second light transmitting section. Idlers supported by the housing means guide the first light obstructing band section into closely spaced parallel relationship with the second light obstructing band section.

21 Claims, 5 Drawing Sheets

MECHANICAL APERTURE FOR CONTROLLING ILLUMINATION LEVEL

CROSS-REFERENCE TO RELATED APPLICATIONS

Reference is made to commonly assigned U.S. patent application Ser. No. 08/073,832 entitled "Illumination Control System for a Film Scanner" filed on even date herewith.

BACKGROUND OF THE INVENTION

1. Field of the Invention

This invention relates to an electro-mechanical aperture setting apparatus capable of rapid, precise changes in aperture setting, and particularly to an aperture setting system suitable for regulating the illumination level in a light beam of a telecine scanner that is capable of a dynamic range of operation to a specified illumination level within the time allotted for scanning a film frame.

2. Description of the Prior Art

State of the art illumination systems for telecine film scanners typically include a light-sensitive, charge-coupled device (CCD) linear array which provides a serial output representing a line of a television raster and a light source for illuminating a linear section of the film being scanned with either a scanning light beam or a line of diffuse light. For color television, one version of a film scanner can include a light source that is subjected to dichroic filtration to tailor the spectral content of the light according to the film to be scanned and directed into a light integrator which forms a line of diffuse light for illumination of the film frame. The line of light must be sufficiently uniform in intensity and diffusion along its length and have the red, green and blue spectral radiance for the film being scanned. The film is held in a cylindrical shape and moved past the line of diffuse light. The light passing through the illuminated linear section is color and intensity modulated by the image therein and imaged onto three color filtered CCD arrays as described, for example, in commonly assigned U.S. Pat. Nos. 5,012,346 to DeJager et al. and 5,003,379 to Moore, Jr. et al.

The film motion provides the vertical (frame) scan, and the linear, synchronized electronic cycling of the CCD arrays provides the horizontal (line) scan of a rasterized television signal with both chrominance and luminance components. A number of the considerations taken into account in scanning positive or print and negative color film stocks with such telecine film scanners is set forth in the article "Optical scanning system for a CCD telecine for HDTV" by Kurtz et al. in *SPIE*, vol. 1448 Camera and Input Scanner Systems, 1991, pp. 191–205.

As described in that article and in commonly assigned U.S. Pat. Nos. 4,868,383 and 5,155,596, to Kurtz et al, and 5,012,346, to DeJager et al, such film scanner linear light sources have difficulty transforming light emitted by a source lamp into a line of diffuse light of sufficient, uniform intensity or brightness for the full lamp life and operating intensity range required and which does not vary from moment to moment due to lamp "noise". In the '383 and '346 patents, a linear light integrator is provided with a light intensity sensor and feedback circuit for regulating the lamp power supply to dampen light output intensity fluctuations of the Xenon arc lamp. Intensity-fluctuations from the targeted lamp intensity may be both temporal and spatial, as arc length and position within the lamp envelope varies and shadows caused thereby change from moment to moment. The severity of the fluctuations increases as lamp current is decreased, so the Xenon arc lamp is driven at a relatively high current and intensity.

The integrating cylinder is designed to integrate the light beam from the lamp so that a line of light is emitted that is uniform in intensity along the length of the aperture at any given moment, regardless of spatial fluctuations in light beam intensity. Consequently, the intensity of the uniform line of light varies temporally. The temporal variation in integrated light intensity from the target or reference intensity is referred to as illumination "noise" that is considered in measuring the illumination signal-to-noise (S/N) ratio performance of the system. In the '596 patent, the instantaneous intensity of the light in the integrating cylinder is monitored by the light intensity sensor and feedback circuit to develop a correction factor to increase or decrease the lamp drive current to improve the overall illumination S/N performance.

As described in the '596 patent, there is also a need to regulate the intensity of light entering a light integrating cylinder in response to changing characteristics of the optical path, the film scanning speed, the film type, and the ageing of the arc lamp. Light intensity can only be varied in a narrow range by controlling current to the short arc Xenon lamp, because lamp life is shortened as lamp current is increased, and illumination S/N performance is degraded as lamp current is decreased. Moreover, when CCD arrays are employed, the further electrical signal-to-noise (S/N) performance of the CCD elements as a function of light intensity limits the range of variation in illumination.

The CCD elements, in converting light into electrical output signals, create a relatively fixed level of electrical operating noise which is included with the output signal representative of the intensity of the light transmitted by the image pixels. If the elements are not charged by the pixel illumination intensity to a level in the normal intensity variation operating range, e.g. may occur when low intensity light is blocked in a dark scene, the fixed noise contributes a greater proportion to the output signal, and the S/N ratio decreases, leading to loss of image detail. Widening the lamp intensity output range would therefore degrade system S/N performance in the low output regions of the range. Lamp current control is thus relegated to a narrow range of modulation of the lamp current in response to illumination level S/N variations in lamp arc performance.

The wide dynamic range of adjustment necessary to scan different types of film is left to a motor driven aperture wheel described in the '596 patent and the above-referenced article. The aperture wheel intercepts the light beam from the arc lamp before it enters the integrating cylinder and is set to provide a specific aperture to adjust overall light intensity in the light beam depending on the film type and operating conditions of the lamp for the duration of scanning of the film.

There are additional reasons for adjusting the intensity of the light beam than compensating for film type and for temporal fluctuations in lamp output. Typically, a given movie contains a variety of scenes resulting in differing average film densities from scene to scene, e.g. dark night and bright day scenes. In a darkened theater, when the scenes are projected from the print movie film, even the darkest scenes are visible, and the contrast between the darkest and lightest parts of the scene is high. However, the television viewing experience is quite different. The television is usually viewed in moderately to brightly lit surroundings and this ambient light reduces the contrast between dark and bright portions of the image. Furthermore, the television screen image contrast and resolution is limited by phosphor flare and lag resulting in a lower resolution and dynamic contrast range than a projected print movie film. The combined effect of the bright ambient lighting and the low dynamic range screen is that television images of a movie have considerably less visual contrast when compared to the original projected print.

To compensate, the experienced telecine operator or colorist will pre-program the color balance and signal level settings on a scene by scene basis. The colorist seeks to compensate for the deficiencies in television images and to still provide artistic qualities of each scene similar to the original projected scene.

For a dark scene, where even the highlights are dark, the colorist may increase the signal level such that the highlight is brought to 100% video signal level. This also has the effect of increasing the average signal level for the entire scene. Though this gain in signal level could be adjusted electronically, doing so has the effect of increasing noise levels as well. The preferred method for increasing the video signal would be to increase the illumination level by increasing the amount of light emitted by the integrating cylinder and directed on the film image frames. However, current telecine systems are incapable of changing light intensity at real time film frame rates.

Summarizing the above, the telecine conversion of negative, master and positive, print movie films for television broadcast or reproduction on videotape or videodisc for playback on television, particularly HDTV, involves a number of considerations described amply in the cited references. Temporal fluctuations in the arc lamp output intensity is one of the significant causes of flicker in the resulting video playback image. In addition, for aesthetic reasons relating to the differing viewing conditions and the limited or differing dynamic brightness range of television screens, it is desired to alter the scanning illumination upon a scene change from the baseline commanded light intensity value. The baseline commanded light intensity value is defined depending on the film type and has been set in the system described in the '596 patent by the position of the aperture wheel for the duration of the telecine conversion.

3. Problems to be Solved by the Invention

It is not possible to provide near real-time brightness control by adjusting scanning line intensity within a typical film frame scanning interval by rotating the motor driven aperture wheel described in the '596 patent. The size of the wheel, and thus its inertial mass, necessitated by the illumination beam diameter, poses a formidable challenge to developing a compact driver capable of indexing to a new aperture at film frame scanning rates. Also, the Gaussian distribution of beam intensity as a function of position within the generally circular light beam creates a non-linear control system gain detrimental to high bandwidth operation and consistent performance during level change with an aperture wheel.

SUMMARY OF THE INVENTION

It is therefore the object of the present invention to overcome the problems in the prior art as discussed above and to provide an aperture setting apparatus to control illumination level in an aperture control system for a film scanner or any other optical system requiring rapid and precise light level adjustment through the setting of an aperture in an optical path.

It is a further object of the present invention to provide a light modulating aperture setting apparatus that has inertia low enough to allow fast aperture setting operation for near real time illumination control in a telecine converter.

It is a still further object of the present invention to provide such an aperture setting apparatus that interrupts the optical path in a nearly single plane and in a symmetrical manner from outside the path to preserve illumination uniformity and utilize the beam center light which has lower noise levels.

It is yet a further object to provide such an aperture setting apparatus for providing real time position feedback information to the control system to maintain a steady aperture position.

It is still a further object to provide such an aperture setting apparatus that is structurally stiff so that it responds rapidly within a limited range of movement to provide a wide dynamic range with high resolution and does not consume power in maintaining an aperture position.

In accordance with these and other objects, the aperture setting apparatus for telecine scanning and other high speed applications and for selectively adjusting the amount of light in a light beam in response to the commanded light intensity signal comprises: aperture defining means selectively locatable in a plurality of aperture defining positions for selectively decreasing or increasing the diameter of said generally circular light beam to interrupt more or less of said light beam and thereby selectively adjust the amount of light in said light beam; means for restraining movement of said aperture defining means within a limited range; and drive means responsive to the commanded light intensity signal for locating said aperture defining means in a selected one of said plurality of aperture defining positions.

In a preferred application or use, the aperture setting apparatus is employed in an illumination system for a film telecine scanner of the type adapted to provide a line of illumination on the image frames of a film which is supported for movement in a film gate of the scanner and comprising a light source which is adapted to provide a generally circular light beam in an optical path in said system, and illumination means located in said optical path for receiving said light beam and for producing a line of diffuse illumination on said film.

In a preferred embodiment, the aperture defining means further comprises: a housing positioned in the optical path having an opening for passing the light beam; first and second movable blades supported by the housing and movable between a full open aperture position with respect to the opening and through a plurality of stopped down aperture defining positions in the opening, the first and second movable blades having respective first and second leading edges shaped to define a respective plurality of stopped down apertures generally defining the diameter of the generally circular light beam passing therethrough and entering the light integrating means, whereby spatial variations in intensity in the light beam are minimized at the plurality of stopped down apertures; and means for moving the movable blades with respect to one another in response to a commanded light intensity signal so that the first and second leading edges move relative to and overlap one another when in the plurality of stopped down aperture defining positions More specifically, the first and second movable blades further comprise: a continuous, single piece, elongated band having first and second centrally disposed light obstructing or solid band sections formed in parallel planes with respect to one another and first and second light transmitting or cut-out band sections separating the first and second light obstructing band sections and forming first and second end loops of the elongated band, the first and second shaped leading edges formed as edges of the first and second light obstructing band sections defining one side of the first and second respective light transmitting band sections which face one another and interrupt the light beam in near the same plane as the first and second light obstructing band sections are moved in parallel with respect to one another and the opening.

In order to support and move the elongated band, first means supported by the housing engage and provide rotational and tensioning support for the first end loops of the first light transmitting section; second means supported by the housing engage and provide rotational driving force to the second end loops of the second light transmitting section; and third means supported by the housing means guide the first light obstructing band section into closely spaced parallel relationship with the second light obstructing band section.

In use, the generally circular light beam exhibits a non-linear relationship between light beam power level and distance from the center of the light beam, and in accordance with a further aspect of the invention the first and second leading edges are shaped to at least partially compensate for the non-linear relationship at the plurality of aperture defining positions and reduce the ratio of maximum to minimum non-linear system gain and lower the sensitivity to aperture position errors in the low transmission region which allows finer resolution of aperture defining positions. In particular, the first and second leading edges are shaped to define first and second symmetric, partially elliptical, blade openings, each elliptical blade opening having a further centrally disposed V-shaped opening extending in the direction of movement of the first and second movable blades that reduces the ratio of maximum aperture to minimum aperture non-linear system gain and lowers the sensitivity to aperture position errors as aperture size is decreased.

In the preferred embodiment of the present invention, the aperture wheel of the '596 patent is replaced by light weight, thin, movable blades that interrupt and attenuate the illuminating beam from outside the beam area as the blades are moved together. The blades are placed at a location along the beam midway between an aperture stop and a field stop plane prior to the integrating cylinder. Blade opening shape, through which the illumination beam passes, is designed to lower the ratio of maximum system gain to minimum system gain where gain is the ratio between change in illumination level and change in blade position. The shape also aids in lowering the sensitivity to aperture position errors in very low transmission operating positions or near closed aperture position. The blades have sufficiently light inertial mass to allow movement in the specified time when driven by a miniature, high performance, permanent magnet D.C. motor. Blade position into the beam is monitored by a position sensor. Preferably, the blades are formed of sections of a circular band mounted so that the sections are aligned in parallel and so that the band is moved by the motor.

Advantages of the Invention

A principal advantage of the aperture setting apparatus is the speed and accuracy in which an aperture change can be made in the source light beam entering the integrating cylinder of the telecine scanner through the operation of the blade mechanism. Adjustment of the blade mechanism from any aperture position to a new aperture position within nominally 33 milliseconds can be achieved within about 1/15 F-stop aperture resolution. The aperture shape provides a full dynamic range of illumination levels of greater than 7 F-stops. The blade mechanism does not generate any load forces at rest. Between level changes therefore, tight aperture position regulation can be maintained, yet power consumption is low in the absence of external disturbances, allowing a higher duty cycle of level changes in cooperation with the illumination control system. Other attributes of the aperture setting apparatus of the invention include:

provides a compact, limited angle motor drive compatible in size with the blade apparatus and the existing space envelope;

interrupts the light beam in a near single plane in a position midway between an aperture stop and a field stop plane to minimize the affects on uniformity;

interrupts and provides apertures for large diameter light beams with a wide range and fine resolution;

provides long life with high reliability, low part count, and no wearing linkage;

possesses a stiff mechanical drive between torque source and beam interrupting blades formed by a continuous band; and maintains constant preset tension and alignment of the aperture defining, continuous band resulting in a stiff, low inertia and highly responsive aperture setting mechanism.

BRIEF DESCRIPTION OF THE DRAWINGS

Other objects, features and advantages of the invention will become apparent upon reference to the following description of the preferred embodiments of the invention, in which.

DETAILED DESCRIPTION OF THE PREFERRED EMBODIMENTS OF THE PRESENT INVENTION

Figure 1:
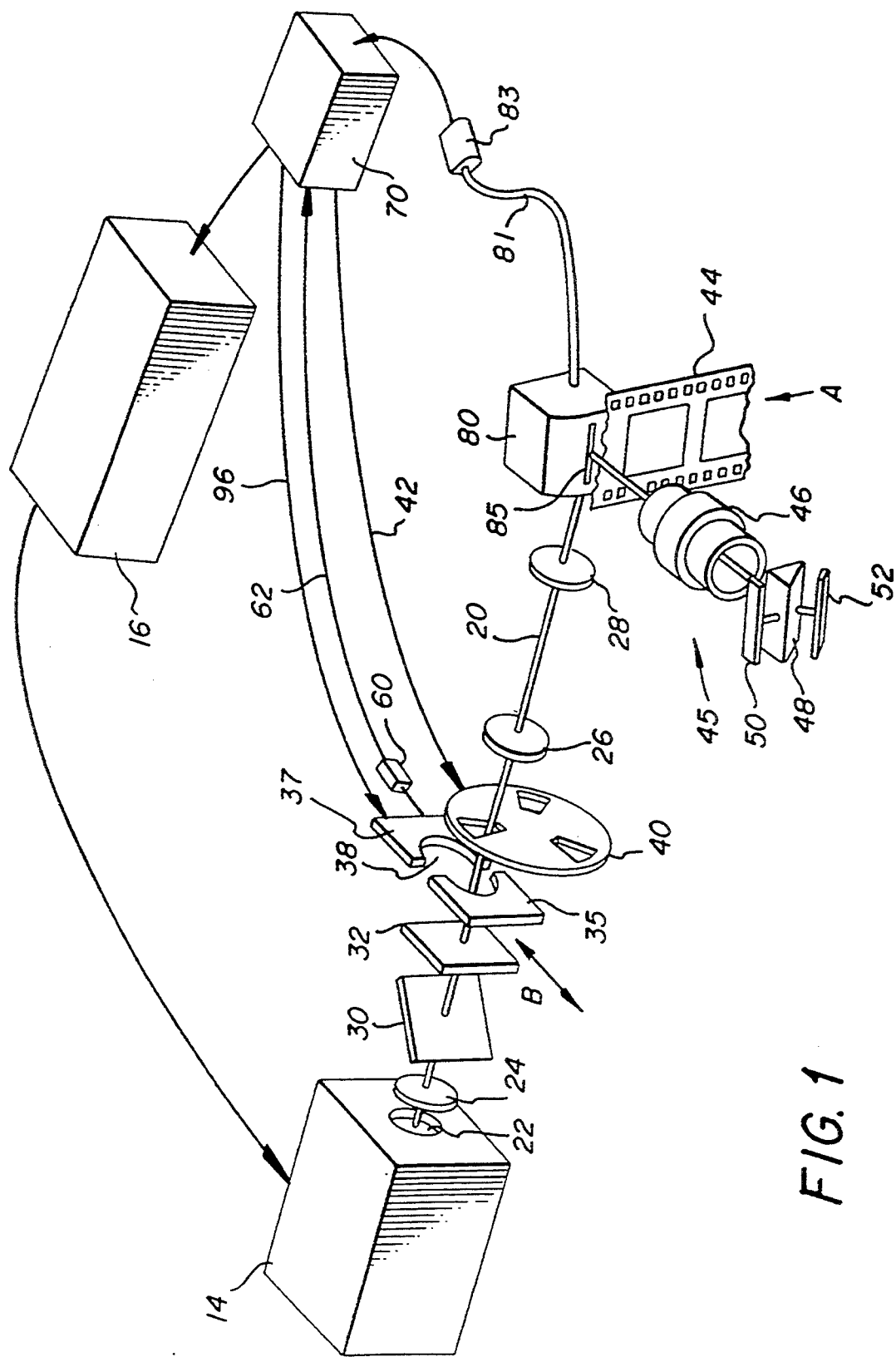
FIG. 1 is a simplified schematic perspective view of the components of the illumination control system of the invention in combination with certain elements of the telecine scanner.

Referring to FIG. 1, it depicts a simplified schematic perspective view of the components of one type of an illumination control system of the invention in combination with certain elements of the telecine scanner that are similar to FIG. 1 of the '596 patent and FIG. 11 of commonly assigned, co-pending U.S. Ser. No. 891,143 filed Jun. 1, 1992, to Kaplan et al., now U.S. Pat. No. 5,241,459 both of which are incorporated herein by reference in their entireties.

The depicted illumination system includes a 300 W Cermax Xenon short arc lamp in a lamphouse 14 powered by a variable drive, linear power supply 16 that emits a light beam in an optical path 20 through a normally open shutter 22 and condensing lens 24. The light beam in the optical path 20 is shaped to be circular in cross section by a series of condensing lenses 24, 26 and 28 and filtered by pre-gate spectral filters 30 and 32 or a set of alternative filters described in the '596 patent for scanning positive or negative film types. A filter wheel 40 is interposed in the optical path 20 so that one of the three depicted sets of film-specific custom interference filters mounted in the wheel can be selected for calibration and for scanning of Eastman Color Negative and Eastman Color Positive films to effect proper color balance to the type of film scanned in a manner described in the above referenced *SPIE* article and the '379 patent. After calibration, if necessary, the selected filter set is positioned in the optical path for the duration of the telecine scanning operation in response to a signal from the illumination control system console 70.

Figure 2:
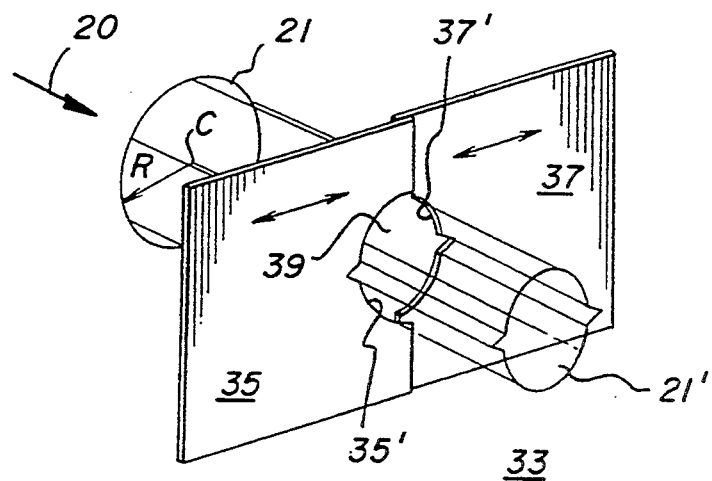
FIG. 2 is a sketch of the light beam aperture defining mechanism employed in FIG. 1.

Referring to FIG. 2 and in accordance with the present invention, an aperture defining mechanism 33, rapidly and precisely controllable to provide a plurality of aperture openings in a plurality of aperture defining positions, is provided in the optical path 20, preferably positioned midway between an aperture stop and a field stop with respect to the lenses 24 and 26. The preferred embodiment of the aperture defining mechanism 33 comprises a pair of movable blades 35 and 37 defining an aperture 39 centered in the optical path 20 that is operated to shape the light beam and modulate the beam power level in a manner to be described hereafter. A position sensor (not shown) provides a position signal to the illumination control system console 70, and the console 70 provides a drive current signal to the drive motor of the blades 35 and 37 in a manner to be described.

The light beam 21 passing through the aperture 39 in optical path 20 is filtered by the selected filter set in filter wheel 40, shaped by the condensing lenses 26 and 28 and directed into a light entrance port of integrating cylinder 80, which is preferably of the type described in detail in the above referenced '143 application, but may be of the type described in the above referenced '346, '383 and '596 patents and *SPIE* article. The light integrating cylinder 80 has a light conducting rod or fiber 81 coupled to a feedback port thereof and to a photosensor 83 which in turn is coupled to a current-to-voltage circuit within console 70 for developing a measured light intensity signal of light within the cavity of the integrating cylinder 80. The measured illumination level is converted to a current value by the photosensor 83 that is in turn converted to a voltage value of the measured light intensity signal.

The integrating cylinder 80 of FIG. 1 is preferably tilted with respect to the optical path 20 and constructed with an end entrance port (obstructed from view) for admitting the light beam 21. The light beam 21 is carefully adjusted for its angular divergence and its angular orientation relative to the axis and physical characteristics of the integrating cylinder 80 so as to provide uniform light output through the linear exit port 85. The admitted light beam 21 is reflected within the integrating cylinder and exits the linear exit port 85 as a narrow line of intense, diffuse light which falls on the image frames of movie film 44 transported past the exit port 85 in the direction "A".

The line of light is modulated in color and intensity by the image dye color and density, and the modulated line is directed to a pickup stage 45. A projection lens 46 directs the line of light onto a beam splitter 48, including a dichroic filter, and which splits the so modulated line image into chrominance and luminance or detail line images directed on respective pickup devices 50 and 52. Pickup devices 50 and 52 are preferably a set of three color filtered CCD linear arrays for providing three color video line chrominance signals and a single CCD linear array, respectively, for providing video raster line luminance signals as described in the '346 and '379 patents and the *SPIE* article, although alternate CCD array systems may be substituted.

The HDTV telecine conversion system, for which the illumination system of FIG. 1 is intended to be used, is designed to accommodate a wide range of movie film types, as itemized in Table I of the '596 patent. The variation in format, perforations, and speed translate into differences in the integration time of the CCD elements of the linear arrays 50 and 52 and thus into differences in illumination (power) level necessary. The Xenon short arc lamphouse 14 can be modulated to different power levels. However, as lamp power is decreased below normal operating levels, the noise (light flicker) emitted increases as the average light output decreases. As described in the '596 patent, the S/N levels of the output source (the line of illumination at the aperture 85 of the light integrating cylinder 80) must be separated by better than 50 db to avoid flicker artifacts in the video image. Also as lamp power is increased above the normal operating range to enhance the S/N level, lamp life is shortened.

Thus, modulation of lamp current is limited to regulating power level in a narrow operating range that can be employed to respond to low frequency, low magnitude level disturbances primarily caused by lamp arc flicker. This control is accomplished by comparing the measured illumination level in the integrating cylinder to the desired level and using the error value to drive the variable lamp power supply toward zero error in a classic servo regulator configuration.

To achieve wide dynamic range of illumination, the light beam obstructing blades 35 and 37 are inserted into the optical path 20 as shown in enlarged detail in FIG. 2 in place of the aperture wheel described in the '596 patent. These thin blades 35 and 37 are carefully located nearly in a single plane and at a location along the optical path 20 midway between an aperture stop and a field stop plane prior to the integrating cylinder 80 and between lenses 24 and 26. This insures that beam reflection angles in the integrating cylinder 80 of the type described in the above-incorporated '143 application are minimally affected. In the other alternative embodiments employing the light integrating cylinders of the above referenced '596 patent and SPIE article, placement of the blades is not as sensitive.

Figure 4:
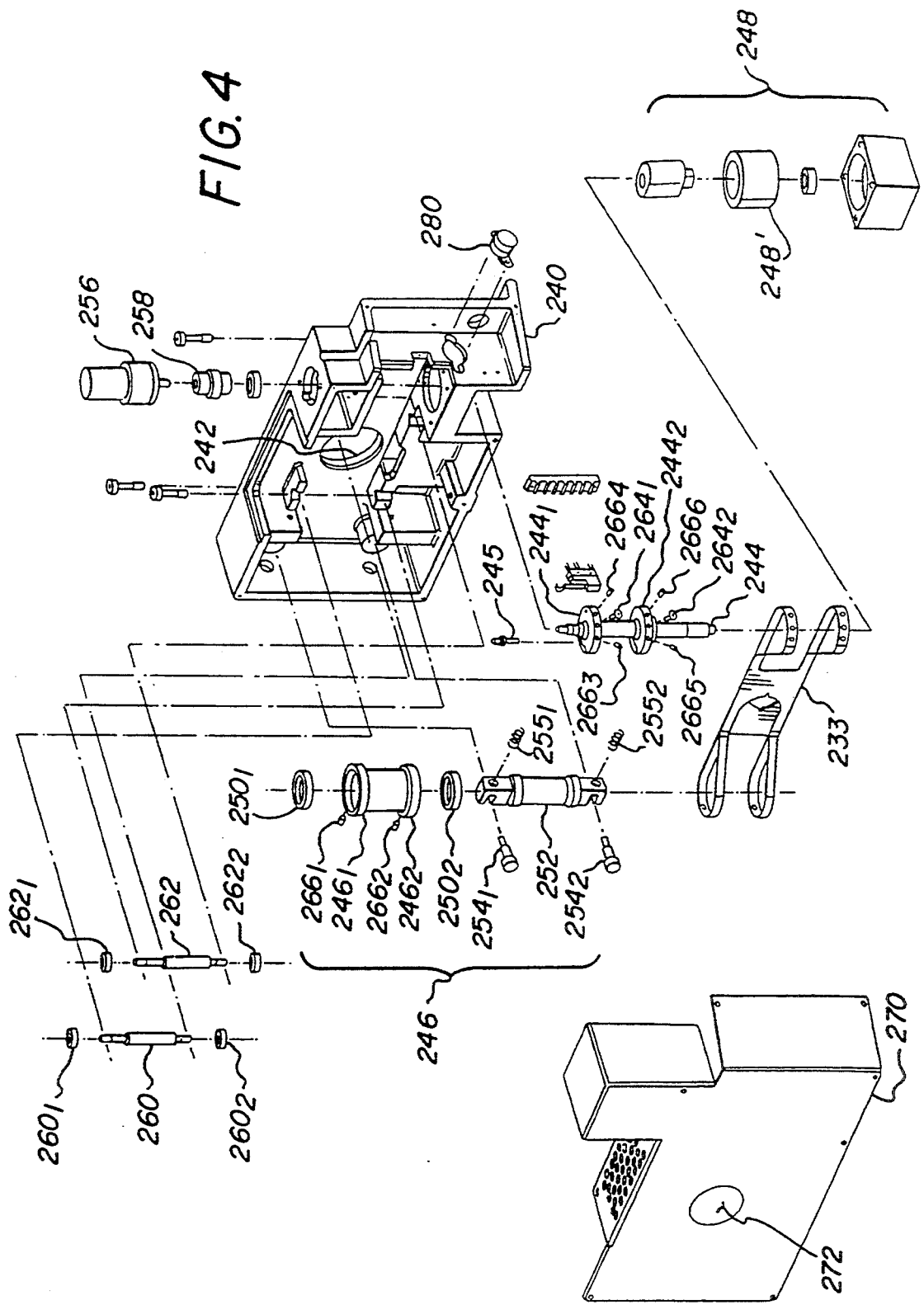
FIG. 4 is an exploded isometric view of the components of the aperture setting apparatus of the invention.
Figure 5:
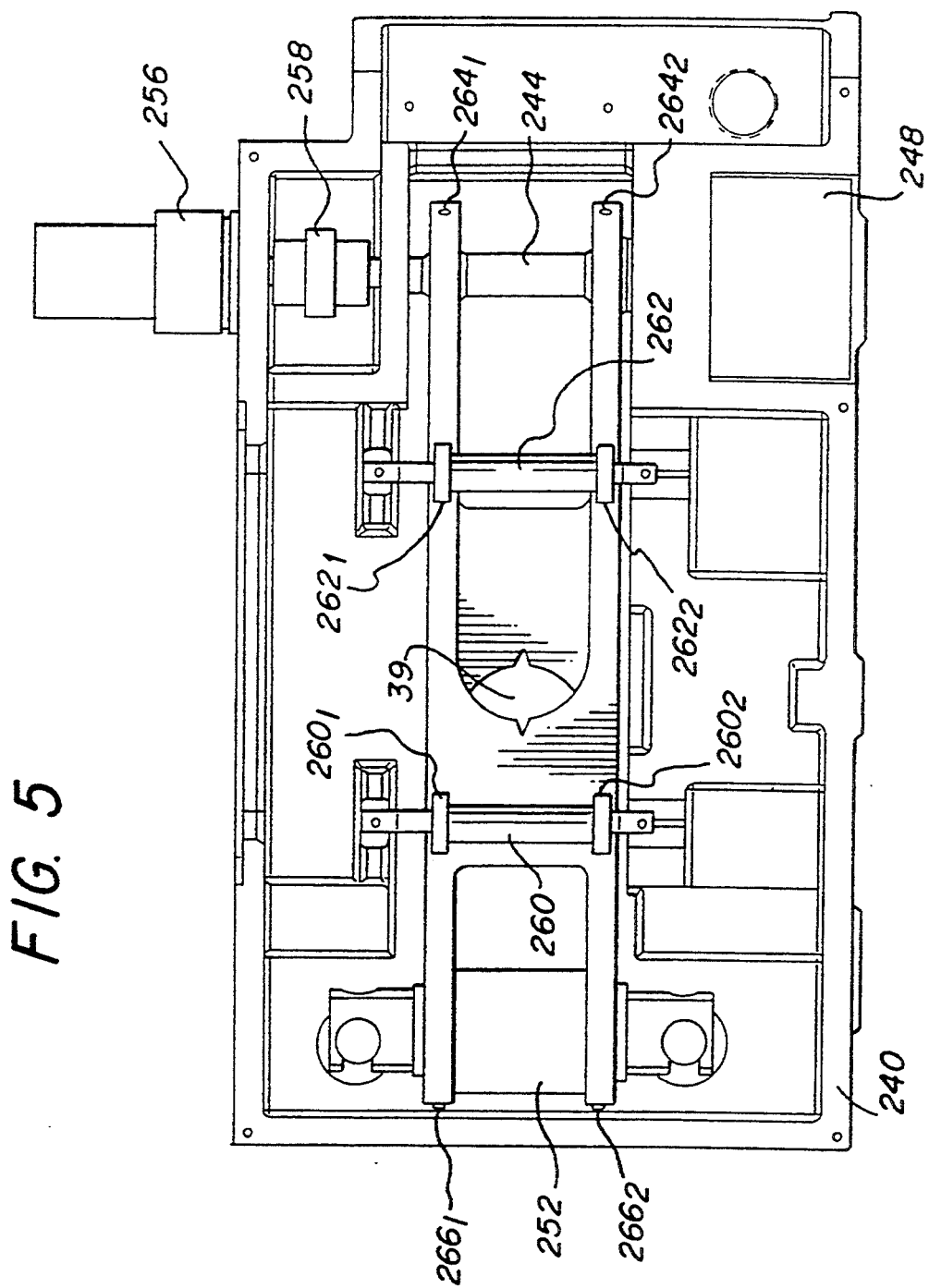
FIG. 5 is a front view of the components of FIG. 4 assembled without the front cover in place.
Figure 6:
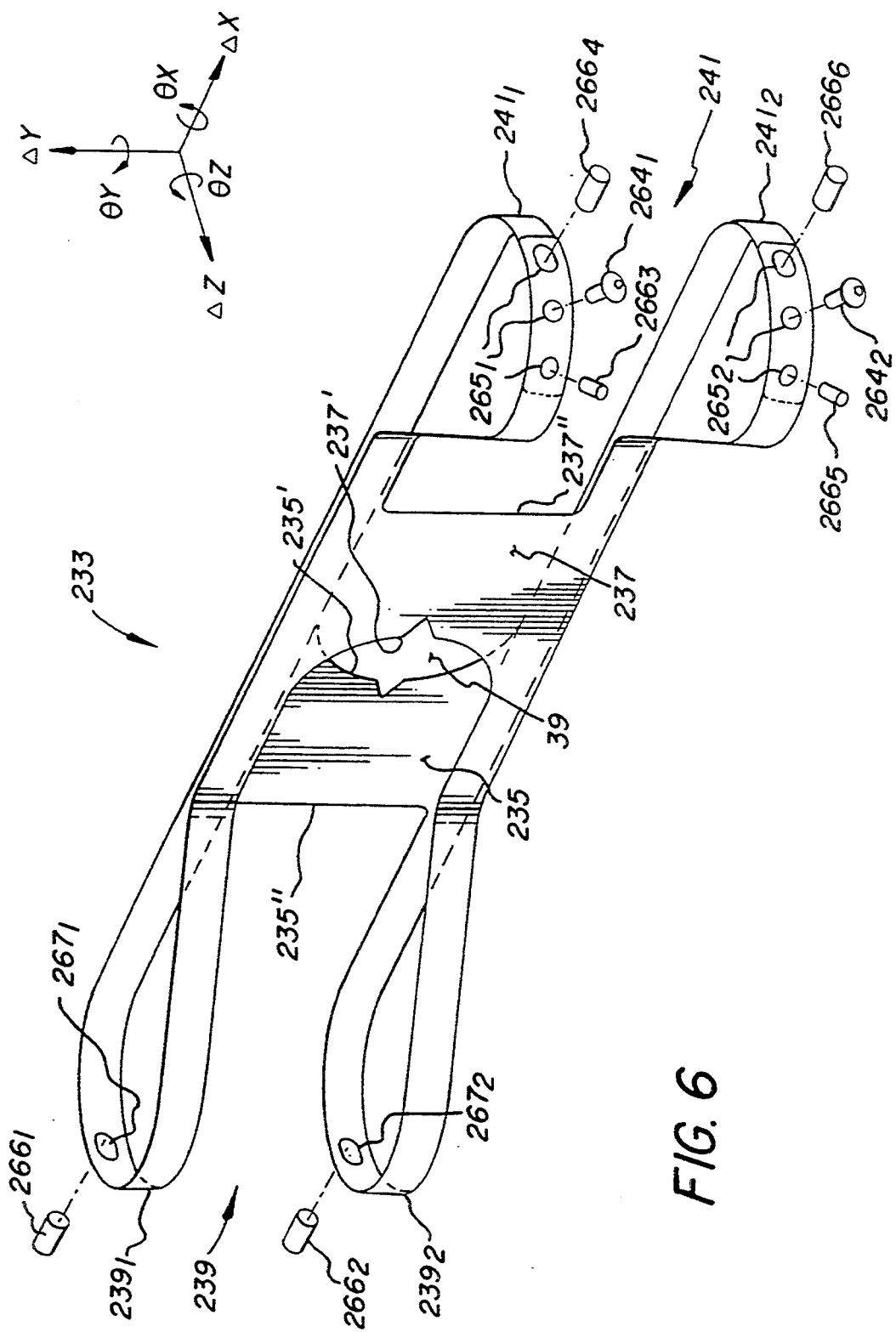
FIG. 6 is a perspective view of the steel band employed in the apparatus of FIGS. 4 and 5.

At this point in the optical path 20 of FIG. 1, the light beam 21 is nearly circular in cross section and has a nominal diameter established by the lens system. The blades 35 and 37, operated by a mechanism described hereafter with respect to FIGS. 4–6, are moved inward or outward preferably in a horizontal direction indicated by the arrow "B" simultaneously to shape and decrease or increase the diameter of the light beam passing through the aperture 39. The symmetric elliptical and "V"-shaped cut-out blade openings 35' and 37' defining the aperture 39 move symmetrically in mirror image relation relative to each other to cut the light beam 21 equally from both sides. This preserves the low noise, center light beam characteristic and helps to maintain lengthwise uniformity of light output of the integrating cylinder slit in all of the aperture positions. Moreover, as the aperture 39 is closed, it closes more slowly in the vertical direction than the horizontal direction, preserving vertical light similar to the closure of the iris of a cat's eye. This minimally affects the uniformity of light output at the elongated exit port 85 of the light integrating cylinder 80.

The blades 35 and 37 are low in mass and driven by a high performance motor (not shown) in the direction of arrow "B" to allow fast changes in position comparable to film frame scanning rates. By providing near real time illumination control in the telecine system to adjust illumination level within one film frame scanning interval, the video system can substitute the scanned image frame data of the previous or succeeding film frame in place of the transition frame. Illumination levels can thus be changed without the need to stop the film transport system and can also avoid the creation of a video image with a visible transitioning light level. The real time blade control is effected by the motor and drive, and the position sensor 60 provides absolute position information for use in the blade control.

Control of the position of the blades 35 and 37 is accomplished using a continuous control scheme configured as a servo regulator as described in the '832 application first referenced above. In this scheme, the parameter to be controlled is fed back with proper polarity and compared to a reference level for that parameter. The error between the reference and feedback signals becomes the drive signal to the blade power stage, with signal polarities designed to always apply force in the direction to reduce error to zero. The strength and stability of the drive force to zero the error is determined by error signal gain and is termed "proportional error". Derivative and integral action on the error signal can be added to achieve a variety of dynamic responses. Consistent dynamic response is thus determined by the non-variance and linearity of the system gain elements that determine total error signal gain.

In the co-pending '832 application first referenced above the control system is described wherein two feedback signals representing the control parameters "intensity level" and "blade position" are employed in servo regulation with respect to corresponding illumination level and blade position reference values. Illumination intensity error and position error signals are derived which are respectively gain shaped by respective intensity and position gain signals. The intensity gain signal is non-linear and varies as a function of aperture position. The position gain signal is a fixed, linear amplification factor applied to the position error signal in order to achieve desired dynamic response. Since the two control parameters are not independently controllable, simultaneous servo regulator control would conflict. This is avoided by always setting either intensity gain or position gain to zero, effectively disabling the respective servo regulator, during differing states of operation.

Figure 3:
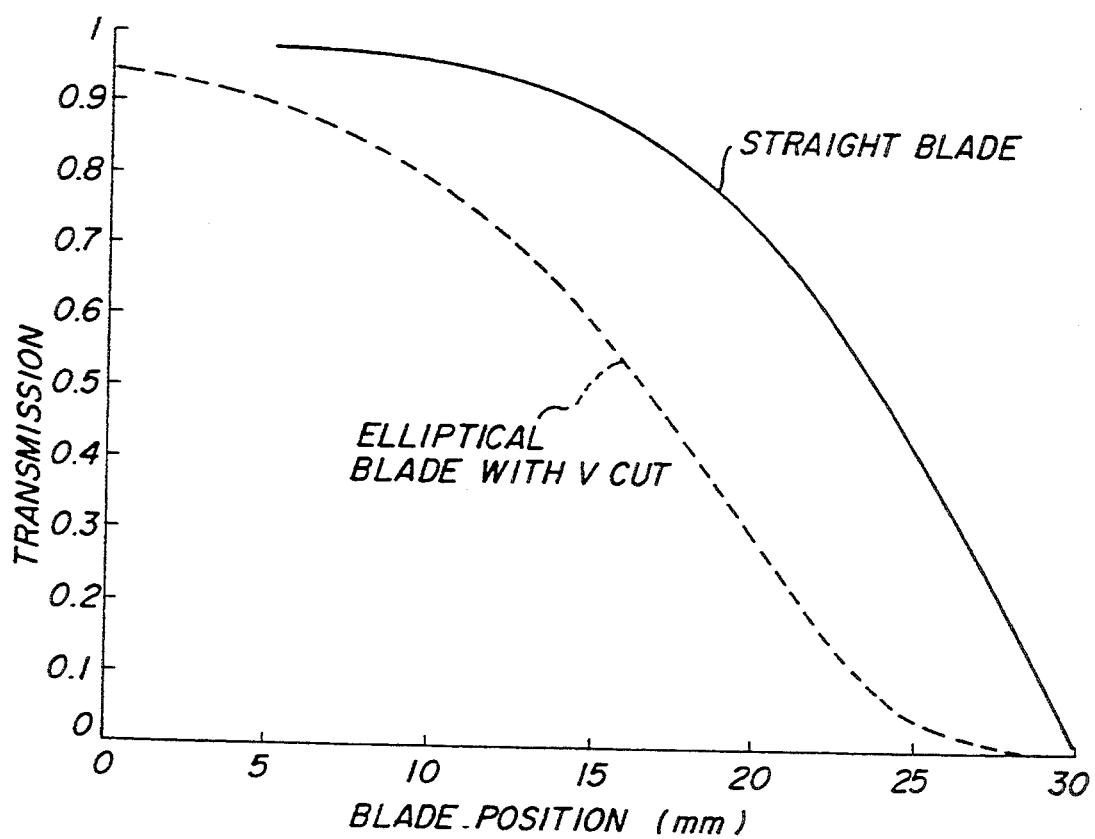
FIG. 3 is data plotted to show the transmission versus blade opening characteristics of a pair of straight blade edges compared with the pair of elliptical shaped blade edge openings with a center "V" cut therein of FIG. 2.

The near Gaussian nature of the beam power level from point to point outward from its center C and along its radius R creates a very non-linear relationship between change in beam power level transmission through the aperture versus aperture position change as depicted in the curves of FIG. 3. The transmission curves depicted are derived given the Xenon lamp Gaussian beam power distribution and are shown as a function of blade position which increases in value with each blade moving equally from outside the beam toward the center C.

The transmission characteristics of a pair of blades with straight beam intercepting edges (i.e., without the openings 35' and 37' and similar conceptually to the spiral opening of the aperture wheel of the '596 patent) is shown in the solid line curve in FIG. 3. This transmission curve exhibits a very large change in intensity gain as blade position changes, where such intensity gain is defined as the incremental change in illumination level versus change in blade position. The straight edge shape also provides a very high sensitivity of beam intensity change to blade position in the low transmission operating region (i.e. nearing totally closed aperture), especially when measured in the F-stop, or logarithmic, domain.

In accordance with a preferred embodiment of the invention, the aperture opening 39 of the blades 35 and 37 is shaped to improve or lower the ratio of maximum to minimum intensity gain. Also, the shape improves resolution by lowering the sensitivity to aperture position errors in the low transmission region, i.e., near the fully closed blade position. The dotted line curve of FIG. 3 shows the transmission characteristics of the pair of elliptical shaped and center "V" cut blade openings 35', 37'. This curve is somewhat more linear and exhibits a lower intensity gain in the low transmission region. However, the shaping of the blade openings 35', 37' is not fully effective in eliminating the non-linearity of intensity gain with respect to aperture position.

The preferred embodiment of the aperture setting apparatus 33 is depicted in FIGS. 4 and 5, wherein the blades 35 and 37 are realized in respectively numbered sections of a thin (0.002 inch), continuous, steel band 233 shown separately in FIG. 6. The steel band 233 has solid, flat, center sections and cut-out, loop, end sections as shown. The solid, flat sections 235 and 237 of steel band 233 are bounded by shaped sides 235' and 237' that have the same shape as the openings 35' and 37' described above that allow the light beam to pass through the aperture 39 defined when steel band sections 235 and 237 are aligned closely together and in parallel so that the shaped sides 235' and 237' are properly aligned as shown. The solid sections 235 and 237 are also bounded by flat sides 235" and 237" at the boundaries with the loop end sections. The elongated cut-out openings 239 and 241 split the band lengthwise into parallel, narrow loop sections $239_1$, $239_2$ and $241_1$, $241_2$ that ride on bearings and a motor drive spool as shown in FIGS. 4 and 5.

As illustrated in FIG. 2, the shaped sides 235' and 237' of the cut-out openings 239 and 241 provide the aperture opening 39 for the illumination beam to pass through. The near Gaussian nature of the illumination beam distribution creates a non-linear relationship between change in beam power versus aperture position change. As described above, the aperture opening is shaped to improve or lower the ratio of maximum to minimum gain, where gain is the change in intensity error with respect to position as described above. Also, the aperture shape improves resolution by lowering the sensitivity to aperture position errors in the low transmission region at or near the fully closed aperture position.

Turning to FIGS. 4 and 5, the aperture setting apparatus 33 includes a box-shaped, die cast housing 240 and a front metal cover 270, each having aligned aperture openings 242 and 272, respectively, within which the steel band 233 is mounted for movement by an internally contained drive and idler mechanism. In the housing 240, the cut-out band loop sections $241_1$, $241_2$, and $239_1$, $239_2$, are attached to the drive spools $244_1$, $244_2$, (attached to the drive shaft 244), and are wrapped around the tension and return idler assembly 246 including the bearing races $246_1$, $246_2$, respectively. The solid band sections 235 and 237 are generally supported and moved laterally in first and second parallel planes so that the shaped sides 235' and 237' face one another. A drive motor assembly 248 rotates the drive shaft 244 and thereby moves the steel band 233 to draw the shaped sides 235' and 237' toward and away from one another from a center point of the aligned aperture openings 242 and 272 in a prescribed or limited range of motion. A pin stop 245 attached to housing 240 interferes with the drive assembly to prevent rotation of the drive shaft 244 beyond the limited working range.

The thin steel band 233 is wrapped around the motor drive spools $244_1$, $244_2$, over a further pair of first and second idlers 260 and 262, the tension and return idler 246 mounted bearing races $246_1$, $246_2$, and back to the drive spools $244_1$, $244_2$. The tension and return idler 246 bearing races $246_1$, $246_2$ are supported by respective bearings $250_1$, $250_2$ that rotate on a stationary axle 252 that is mounted by shoulder screws $254_1$, $254_2$ to the housing 240. The shoulder screws $254_1$, $254_2$ allow the slotted ends of the axle 252 to be biased by springs ($255_1$, $255_2$) away from the drive spools $244_1$, $244_2$ and provide constant band tension across the entire band height.

The first and second idlers 260 and 262 have bearing outer races $260_1$, $260_2$, and $262_1$, $262_2$, respectively, that bear against the edges of solid section 235 on one side of the band 233 and guide the front and rear band sections 235 and 237 into nearly the same plane. The idler bearing assemblies of each such idler 260 and 262 are configured such that only the races bearing on the steel band 233 rotate to achieve a low mass.

Consequently, the steel band 233 and the drive spools $244_1$, $244_2$ and the tension and return idler mounted bearings $246_1$, $246_2$, have sufficiently light inertial mass to allow movement in the specified time when driven by a miniature, high performance, permanent magnet D.C. motor 248' in drive motor assembly 248. To maintain long life, the thickness of the steel band 233 and the bending radius about the idlers and drive spools are carefully specified to ensure that the bend radii are greater than minimum specified for the steel band.

In this regard, the steel band 233 cut-outs or openings 239 and 241 reduce the mass of the steel band 233 to allow higher acceleration and are further shaped to remove the clock spring effect of the loop portions of the band as it passes over the drive spools and the idlers. This clock spring effect arises if unequal areas of the steel band are bent on the driven end and the idler end as the drive spools are rotated. Such a clock spring effect would provide a constant load force on the motor and the control system affecting dynamic response and accuracy. The drive motor would be forced to expend energy countering the clock spring effect to maintain the commanded aperture opening, raising its temperature and reducing its ability to respond as frequently to commanded light intensity changes, thus lowering the operating duty cycle.

The drive motor assembly 248 includes an unframed, limited angle, high torque, drive motor 248' is mounted to the drive shaft 244 to provide the torque required for rotation to the drive spools $244_1$ and $244_2$. The motor 248' is preferably a single winding, toroidally wound device that supplies a flat torque profile over the angle of excursion necessary to move the steel band 233 and the shaped side 235' and 237' between full open to full closed aperture positions. The radii of the motor drive spools $244_1$, $244_2$ are sized to provide linear motion of the steel band 233 within the motor working range. Since the motor 248' is a single winding device, no commutation is required, avoiding commutation noise and torque disturbance. The motor 248' is driven by a matched linear power amplifier to further minimize the potential for noise emission.

Accuracy in steering or movement of the steel band 233 must be maintained to insure precision and speed in changing and maintaining the aperture opening designated by the control system. Stable, non-slipping position is maintained by two sets of two registration pins ($266_3$, $266_4$, $266_5$, $266_6$) and an attachment screw $264_1$, $264_2$ on the respective drive spools $244_1$, $244_2$ and registration pins $266_1$, $266_2$ on the respective tension and return idlers $246_1$, $246_2$, respectively. The attachment screws $264_1$, $264_2$ and pins fit in a series $265_1$, $265_2$ of three holes in loop sections $241_1$, $241_2$, respectively, as shown in FIG. 6. Similarly, the pins $266_1$, $266_2$, fit in holes $267_1$, $267_2$ in the loop sections $239_1$, $239_2$, respectively, of the steel band 233 shown in FIG. 6. The band is thereby attached so that it cannot slip off from the drive and idler mechanism.

The tension exerted by the spring loaded, tension and return idler races $246_1$, $246_2$ and the low elasticity of the steel band 233 provides a stiff drive from the motor drive spools $244_1$, $244_2$ to the aperture opening 39 position. This allows the high response servo regulator based control system described in the above referenced '832 application to be implemented.

A rotary variable differential transformer (RVDT) 256 is coupled by a coupling 258 to the drive shaft. 244 attached to the motor drive spools $244_1$, $244_2$. The RVDT 256 is a limited angle device providing a linear output over a limited angle of rotation matched to the system angular range and provides a continuous feedback signal of the absolute position of the steel band 233 which is attached to the motor drive spools $244_1$, $244_2$. The RVDT 256 contains no wearing elements other than bearings and provides continuous information allowing near infinite resolution. The RVDT 256 may be a model R30D obtained from Lucas Schaevitz, Corp. Position information could also be provided by an optical encoder with the appropriate change in control electronics.

Other items depicted in FIG. 4 include a thermostat 280 attached to housing 240 to monitor the temperature of the motor housing. An excessive temperature may be detected and the system may be shut down to avoid damage to the motor.

In use, the low mass steel band 233 is driven back and forth by the high torque motor 248' to allow fast changes in position comparable to film frame rates. The actual position of the band 233, that correlates to the size of the aperture defined by the shaped side surfaces 235', 237', is detected by the RVDT 256. By providing near real time illumination control in the telecine that adjusts the illumination level of the light beam within one film frame scanning interval (e.g. 33 milliseconds), the video system can repeat the previous or succeeding scanned video frame in place of the transition frame. Illumination levels can thus be changed without the need to stop the video or film transport system and without creating a video image with a transitioning light level.

Although this device was designed to work within the illumination control system described in the above referenced '832 patent application, it could be used in other illumination systems either with or without any modifications. And, the aperture shape effected by the shaped sidewalls 135' and 137' could be altered for this and for other applications.

The invention having been described in detail with particular reference to the preferred embodiments thereof, it will be understood that variations and modifications can be effected within the spirit and scope of the invention.

What is claimed is:

1. In an illumination system for a film telecine scanner, of the type adapted to illuminate the image frames of a film and to derive video image frame data from the illuminated image frames within a predetermined frame scanning time interval, comprising an illumination light source which is adapted to provide a light beam along an optical path in said system, and means located in said optical path for receiving said light beam from said light source and for illuminating the image frames of the film with diffuse, uniform illumination, aperture setting apparatus for selectively adjusting the amount of light entering said illuminating means in response to a drive signal comprising:

aperture defining means selectively locatable in a plurality of aperture defining positions in said optical path for selectively decreasing or increasing the diameter of said generally circular light beam to interrupt more or less of said light beam and thereby selectively adjust the amount of light entering said illuminating means, said aperture defining means comprising first and second movable light blocking means formed in a single continuous band having low mass and high structural stiffness sufficient for achieving a selected aperture defining position from any other of said plurality of aperture defining positions within the time span of scanning a single image frame of the film; and drive means operable in a limited range and responsive to the drive signal for selectively locating said aperture defining means in any selected one of said plurality of aperture defining positions by altering the position of said single continuous band and moving said first light blocking means and said second light blocking means with respect to one another.

2. The aperture setting apparatus of claim 1 wherein:
said aperture defining means further comprises:
a housing positioned in said optical path having an opening for passing said light beam;
said first and second movable light blocking means of said single continuous band further comprise:
first and second movable blades formed in closely spaced, parallel straight sections of said single continuous band supported by said housing and movable between a full open aperture position with respect to said opening and through a plurality of stopped down aperture deeming positions in said opening, said first and second movable blades having respective first and second leading edges shaped to define a respective plurality of stopped down apertures generally defining the diameter of said generally circular light beam passing therethrough and entering said light integrating means, whereby spatial variations in intensity in said light beam are minimized at the plurality of stopped down apertures; and
said drive means further comprises:
means coupled with said single continuous band for moving said movable blades with respect to one another in closely spaced parallel planes in response to the drive signal so that said first and second leading edges move relative to and overlap one another when in said plurality of stopped down aperture defining positions.

3. The aperture setting apparatus of claim 2 wherein:
said single continuous band is formed of a light, stiff, light obstructing material with said straight, closely spaced, parallel band sections of a predetermined width each connected to the other through first and second end loop end sections of said continuous band;
said first and second movable blades are formed in said straight, closely spaced, parallel, band sections extending across the width of said band as light obstructing band sections for obstructing said light beam as a function of the overlap of said parallel light obstructing band sections; and
said first and second loop end sections are formed with respective first and second cut-out sections centrally disposed across the width of said band and extending into said straight, band sections between said first and second shaped leading side edges and further first and second trailing side edges of said parallel light obstructing band sections, whereby said first and second shaped leading edges face one another and interrupt said light beam in near the same plane as said first and second light obstructing band sections are moved in parallel with respect to one another and said opening by said drive means.

4. The aperture setting apparatus of claim 3 wherein said aperture defining means further comprises:
first means supported by said housing for engaging and providing rotational and tensioning support for said first loop end section;
second means supported by said housing for engaging and providing rotational driving force to said second loop end section;
third means supported by said housing means for guiding said first light obstructing band section into closely spaced parallel relationship with said second light obstructing band section; and wherein:
said drive means is coupled to said second means.

5. The aperture setting apparatus of claim 2 wherein said generally circular light beam exhibits a non-linear relationship between light beam power level and distance from the center of the light beam, and wherein said first and second leading edges are shaped to at least partially compensate for said non-linear relationship at said plurality of aperture defining positions and reduce the ratio of maximum to minimum non-linear system gain and lower the sensitivity to aperture position errors in the low transmission region which allows finer resolution of aperture defining positions.

6. The aperture setting apparatus of claim 5 wherein said first and second leading edges are shaped to define first and second symmetric, partially elliptical, blade openings, each elliptical blade opening having a further centrally disposed V-shaped opening extending in the direction of movement of said first and second movable blades that reduces the ratio of maximum aperture to minimum aperture non-linear system gain and lowers the sensitivity to aperture position errors as aperture size is decreased.

7. The aperture setting apparatus of claim 6 wherein:
said single continuous band is formed of a light, stiff, light obstructing material with said straight, closely spaced, parallel band sections of a predetermined width each connected to the other through first and second end loop end sections of said continuous band;
said first and second movable blades are formed in said straight, closely spaced, parallel, band sections extending across the width of said band as light obstructing band sections for obstructing said light beam as a function of the overlap of said parallel light obstructing band sections; and
said first and second loop end sections are formed with respective first and second cut-out sections centrally disposed across the width of said band and extending into said parallel band sections between said first and second shaped leading side edges and further first and second trailing side edges of said parallel light obstructing band sections, whereby said first and second shaped leading edges face one another and interrupt said light beam in near the same plane as said first and second light obstructing band sections are moved in parallel with respect to one another and said opening by said drive means.

8. The aperture setting apparatus of claim 7 wherein said aperture defining means further comprises:
first means supported by said housing for engaging and providing rotational and tensioning support for said first loop end section;
second means supported by said housing for engaging and providing rotational driving force to said second loop end section;
third means supported by said housing means for guiding said first light obstructing band section into closely spaced parallel relationship with said second light obstructing band section; and wherein:
said drive means is coupled to rotate said second means through a limited angle to thereby drive said band and move said shaped leading edges to an aperture defining position.

9. The aperture setting apparatus of claim 8 further comprising:

position detecting means attached to said second means for providing a position signal reflecting the position of the aperture defining means.

10. The aperture setting apparatus of claim 1 further comprising:
position detecting means attached to said drive means for providing a position signal reflecting the position of the aperture defining means.

11. Aperture setting apparatus for selectively adjusting the amount of light in a generally circular light beam in response to a commanded light intensity signal comprising:
aperture defining means selectively locatable in a plurality of aperture defining positions for selectively decreasing or increasing the diameter of said generally circular light beam to interrupt more or less of said light beam and thereby selectively adjust the amount of light in said light beam, said aperture defining means comprising first and second movable light blocking means formed in a single continuous band having low mass and high structural stiffness sufficient for achieving a selected aperture defining position from any other of said plurality of aperture defining positions;
means for restraining movement of said continuous band within a limited range; and
drive means responsive to the commanded light intensity signal for locating said aperture defining means in a selected one of said plurality of aperture defining positions by altering the position of said single continuous band and moving said first light blocking means and said second light blocking means with respect to one another.

12. The aperture setting apparatus of claim 11 further comprising:
position detecting means attached to said drive means for providing a position signal reflecting the position of the aperture defining means.

13. The aperture setting apparatus of claim 11 wherein:
said aperture defining means further comprises:
a housing positioned in said optical path having an opening for passing said light beam;
said first and second movable light blocking means of said single continuous band further comprise:
first and second movable blades formed in closely spaced, parallel straight sections of said single continuous band supported by said housing and movable between a full open aperture position with respect to said opening and through a plurality of stopped down aperture defining positions in said opening, said first and second movable blades having respective first and second leading edges shaped to define a respective plurality of stopped down apertures generally defining the diameter of said generally circular light beam passing therethrough and entering said light integrating means, whereby spatial variations in intensity in said light beam are minimized at the plurality of stopped down apertures; and
said drive means further comprises:
means coupled with said single continuous band for moving said movable blades with respect to one another in closely spaced parallel planes in response to a commanded light intensity signal so that said first and second leading edges move relative to and overlap one another when in said plurality of stopped down aperture defining positions.

14. The aperture setting apparatus of claim 13 wherein:
said single continuous band is formed of a light, stiff, light obstructing material with said straight, closely spaced, parallel band sections of a predetermined width each connected to the other through first and second end loop end sections of said continuous band;
said first and second movable blades are formed in said straight, closely spaced, parallel, band sections extending across the width of said band as light obstructing band sections for obstructing said light beam as a function of the overlap of said parallel light obstructing band sections; and
said first and second loop end sections are formed with respective first and second cut-out sections centrally disposed across the width of said band and extending into said straight, band sections between said first and second shaded leading side edges and further first and second trailing side edges of said parallel light obstructing band sections, whereby said first and second shaped leading edges face one another and interrupt said light beam in near the same plane as said first and second light obstructing band sections are moved in parallel with respect to one another and said opening by said drive means.

15. The aperture setting apparatus of claim 14 wherein said aperture defining means further comprises:
first means supported by said housing for engaging and providing rotational and tensioning support for said first loop end section;
second means supported by said housing for engaging and providing rotational driving force to said second loop end section;
third means supported by said housing means for guiding said first light obstructing band section into closely spaced parallel relationship with said second light obstructing band section; and wherein:
said drive means is coupled to rotate said second means through a limited angle established by said restraining means to thereby drive said band and move said shaped leading edges to an aperture defining position.

16. The aperture setting apparatus of claim 14 further comprising:
guide means coupled to said housing for guiding said first and second light obstructing band sections in parallel alignment with respect to one another and across said opening; and said drive means further comprises:
means responsive to a commanded light intensity signal for imparting rotational force through said second loop end section to drive said band and move said shaped leading edges to an aperture defining position.

17. The aperture setting apparatus of claim 13 wherein said generally circular light beam exhibits a non-linear relationship between light beam power level and distance from the center of the light beam, and wherein said first and second leading edges are shaped to at least partially compensate for said non-linear relationship at said plurality of aperture defining positions and reduce the ratio of maximum to minimum non-linear system gain and lower the sensitivity to aperture position errors in the low transmission region which allows finer resolution of aperture defining positions.

18. The aperture setting apparatus of claim 17 wherein said first and second leading edges are shaped to define first and second symmetric, partially elliptical, blade openings, each elliptical blade opening having a further centrally disposed V-shaped opening extending in the direction of movement of said first and second movable blades that reduces the ratio of maximum aperture to minimum aperture non-linear system gain and lowers the sensitivity to aperture position errors as aperture size is decreased.

19. The aperture setting apparatus of claim 18 wherein:
said single continuous band is formed of a light, stiff, light obstructing material with said straight, closely spaced, parallel band sections of a predetermined width each connected to the other through first and second end loop end sections of said continuous band;
said first and second movable blades are formed in said straight, closely spaced, parallel, band sections extending across the width of said band as light obstructing band sections for obstructing said light beam as a function of the overlap of said parallel light obstructing band sections; and
said first and second loop end sections are formed with respective first and second cut-out sections centrally disposed across the width of said band and extending into said straight, band sections between said first and second shaped leading side edges and further first and second trailing side edges of said parallel light obstructing band sections, whereby said first and second shaped leading edges face one another and interrupt said light beam in near the same plane as said first and second light obstructing band sections are moved in parallel with respect to one another and said opening by said drive means.

20. The aperture setting apparatus of claim 19 wherein said aperture defining means further comprises:
first means supported by said housing for engaging and providing rotational and tensioning support for said first loop end section;
second means supported by said housing for engaging and providing rotational driving force to said second loop end section;
third means supported by said housing means for guiding said first light obstructing band section into closely spaced parallel relationship with said second light obstructing band section; and wherein:
said drive means is coupled to rotate said second means through a limited angle established by said restraining means to thereby drive said band and move said shaped leading edges to an aperture defining position.

21. The aperture setting apparatus of claim 19 further comprising:
guide means coupled to said housing for guiding said first and second light obstructing band sections in parallel alignment with respect to one another and across said opening; and said drive means further comprises:
means responsive to a commanded light intensity signal for imparting rotational force through said second loop end section to drive said band and move said shaped leading edges to an aperture defining position.

* * * * *

UNITED STATES PATENT AND TRADEMARK OFFICE
CERTIFICATE OF CORRECTION

PATENT NO. : 5,414,460
DATED : May 9, 1995
INVENTOR(S) : Thomas Niertit, James D. Mckay, Raymond L. Dewolf and Richard J. Sandor It is certified that error appears in the above-identified patent and that said Letters Patent is hereby corrected as shown below:

On Title Page insert -- [73] Assignee: Eastman Kodak Company, Rochester, N.Y. --

Signed and Sealed this

Twenty-second Day of August, 1995

Attest:

BRUCE LEHMAN

Attesting Officer

Commissioner of Patents and Trademarks